(12) United States Patent
Lee et al.

(10) Patent No.: US 7,117,258 B2
(45) Date of Patent: Oct. 3, 2006

(54) METHOD AND APPARATUS FOR ASSIGNING IP ADDRESS USING AGENT IN ZERO CONFIGURATION NETWORK

(75) Inventors: Jong-kuk Lee, Daejon (KR); Sung-soo Kang, Daejon (KR); Hyeong-ho Lee, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 809 days.

(21) Appl. No.: 10/202,660

(22) Filed: Jul. 23, 2002

(65) Prior Publication Data
US 2003/0212774 A1 Nov. 13, 2003

(30) Foreign Application Priority Data
May 8, 2002 (KR) ............................... 2002-25393

(51) Int. Cl.
*G06F 15/177* (2006.01)
*G06F 15/16* (2006.01)
*H04Q 7/20* (2006.01)
*H04L 12/66* (2006.01)

(52) U.S. Cl. .................. 709/222; 709/227; 455/435.1; 370/356

(58) Field of Classification Search ...................... None
See application file for complete search history.

(56) References Cited

U.S. PATENT DOCUMENTS

| 6,219,715 B1 | 4/2001 | Ohno et al. |
| 6,393,484 B1* | 5/2002 | Massarani .................... 709/227 |
| 6,501,746 B1* | 12/2002 | Leung ......................... 370/338 |
| 2002/0069278 A1* | 6/2002 | Forslow ...................... 709/225 |
| 2002/0080752 A1* | 6/2002 | Johansson et al. .......... 370/338 |
| 2003/0169713 A1* | 9/2003 | Luo .......................... 370/338 |
| 2003/0208602 A1* | 11/2003 | Bhalla et al. ............... 709/227 |
| 2003/0224788 A1* | 12/2003 | Leung et al. ............ 455/435.1 |
| 2006/0059264 A1* | 3/2006 | Leung et al. ............... 709/227 |

FOREIGN PATENT DOCUMENTS

KR   241354   2/2002

OTHER PUBLICATIONS rfc2002.txt, Nov. 20, 2001, "IP Mobility Support".

* cited by examiner

*Primary Examiner*—Wen-Tai Lin
(74) *Attorney, Agent, or Firm*—Blakely Sokoloff Taylor & Zafman (57) ABSTRACT

Provided is a method and apparatus for assigning an Internet Protocol (IP) address using agents in a zero configuration network. The IP address assignment method involves: (a) receiving a registration request message of a user computer which contains a home agent IP address, and the ID and password of the user computer; (b) transmitting to the user computer an encoded address answer message which indicates permission of the address registration; and (c) setting up a network environment in the user computer by decoding the encoded address answer message. Problems of mobile IP extensibility and a dynamic host configuration protocol (DHCP) authentication are solved by applying the concept of a mobile Internet protocol agent to the protocol in a zero configuration network.

16 Claims, 7 Drawing Sheets

| ZEROCONF OP (1) | HTYPE (1) | HLEN (1) | IP VERSION (1) |
|---|---|---|---|
| ZEROCONF NODE HARDWARE ADDRESS (16) | | | |
| ZEROCONF AGENT IP ADDRESS (16) | | | |
| ZEROCONF NODE ID (2) | | ZEROCONF NODE PASSWORD (2) | |
| ZEROCONF NODE PRIVATE KEY (4) | | | |

| ZEROCONF OP (1) | HTYPE (1) | HLEN (1) | IP VERSION (1) |
|---|---|---|---|
| ZEROCONF AGENT IP ADDRESS (16) ||||

FIG. 5B

| ZEROCONF OP (1) | HTYPE (1) | HLEN (1) | IP VERSION (1) |
|---|---|---|---|
| ZEROCONF NODE HARDWARE ADDRESS (16) ||||
| ZEROCONF HOME AGENT IP ADDRESS (16) ||||
| ZEROCONF NODE ID (2) || ZEROCONF NODE PASSWORD (2) ||

FIG. 5C

| ZEROCONF OP (1) | HTYPE (1) | HLEN (1) | IP VERSION (1) |
|---|---|---|---|
| ZEROCONF NODE HARDWARE ADDRESS (16) ||||
| ZEROCONF HOME AGENT IP ADDRESS (16) ||||
| ZEROCONF NODE ID (2) || ZEROCONF NODE PASSWORD (2) ||
| CRYPTOGRAPHIC ZEROCONF NODE IP ADDRESS (16) ||||
| CRYPTOGRAPHIC DEFAULT ROUTER ADDRESS (16) ||||
| CRYPTOGRAPHIC DNS SERVER ADDRESS (16) ||||

FIG. 6A

| ZEROCONF OP (1) | HTYPE (1) | HLEN (1) | IP VERSION (1) |
|---|---|---|---|
| ZEROCONF NODE HARDWARE ADDRESS (16) ||||
| ZEROCONF HOME AGENT IP ADDRESS (16) ||||
| ZEROCONF NODE ID (2) || ZEROCONF NODE PASSWORD (2) ||
| ZEROCONF FOREIGN AGENT IP ADDRESS (16) ||||
| RESERVED ZEROCONF NODE IP ADDRESS (16) ||||
| ZEROCONF NODE PUBLIC KEY (4) ||||
| OPTION ||||

FIG. 6B

| ZEROCONF OP (1) | HTYPE (1) | HLEN (1) | IP VERSION (1) |
|---|---|---|---|
| ZEROCONF NODE HARDWARE ADDRESS (16) ||||
| ZEROCONF HOME AGENT IP ADDRESS (16) ||||
| ZEROCONF NODE ID (2) || ZEROCONF NODE PASSWORD (2) ||
| ZEROCONF FOREIGN AGENT IP ADDRESS (16) ||||
| RESERVED ZEROCONF NODE IP ADDRESS (16) ||||
| ZEROCONF NODE PUBLIC KEY (4) ||||
| OPTION ||||

METHOD AND APPARATUS FOR ASSIGNING IP ADDRESS USING AGENT IN ZERO CONFIGURATION NETWORK

BACKGROUND OF THE INVENTION

1. Field of the Invention

The present invention relates to a method and apparatus for assigning an Internet Protocol (IP) address to a node connected to a network, and more particularly, to a method and apparatus for assigning an IP address to a node connected to a network by using a zero configuration.

2. Description of the Related Art

The first method of assigning an IP address was that a user set up an IP address by himself after receiving the IP address from a network administrator on the Internet. Then, the Internet Engineering Task Force (IETF), an institute for enacting Internet standards, suggested a Dynamic Host Configuration Protocol (DHCP) that assigns IP addresses automatically. Although the DHCP is widespread, its function is limited to minimizing the number of IP addresses that are not used in a corresponding network by assigning efficiently IP addresses to many nodes within a network. When a node of a network is moved to another network, the DHCP has a shortcoming that it performs a user authentication poorly.

Although a node of a network is moved, a mobile IP in support of IP address translation performs authentication and allows the general use of a network. However, to use the mobile IP, a mobile agent, which is an administrator of a network for mobile computers, should be set up, which causes the following problems. First, when a mobile node using a mobile IP, i.e., a mobile computer, is moved to another network from a network it belonged to, network resources are wasted a lot because all the traffics transmitted to the node should pass through a home agent, which is an agent of the network the mobile node originally belonged to. A second problem is that one single agent cannot afford to administrate a great deal of mobile nodes.

SUMMARY OF THE INVENTION

To solve the above-described problems, it is an object of the present invention to provide a method and apparatus for assigning an Internet Protocol (IP) address using agents in a zero configuration network, which solves the authentication problem of a Dynamic Host Configuration Protocol (DHCP) as well as the extensibility problem of a mobile IP by applying the concept of a mobile IP agent to protocol.

It is another object of the present invention to provide a computer-readable recording medium that records a program for implementing the method in a computer.

According to an aspect of the invention, there is provided a method for assigning an IP address in a zero configuration network, the method involving steps of: (a) receiving a registration request message of a user computer which contains a home agent IP address, and the ID and password of the user computer; (b) transmitting to the user computer an encoded address answer message which indicates permission of the address registration; and (c) setting up a network environment in the user computer by decoding the encoded address answer message.

According to another aspect of the invention, there is provided a method for assigning an IP address using agents in a zero configuration network provided with a home agent administrating a user computer registered to the network and a foreign agent administrating a user computer not registered to the network, the method involving steps of: (a) transmitting to the foreign agent IP address a user computer registration request message out of the advertisement message received from the foreign agent; (b) the foreign agent receiving the user computer registration request message and then transmitting an agent authentication request message to the home agent; (c) the home agent confirming the user computer ID and transmitting the agent authentication answer message to the foreign agent; (d) the foreign agent encoding an address answer message for the user computer and transmitting the address answer message to the user computer; and (e) the user computer decoding the user computer address answer message and setting up a network environment.

According to another aspect of the invention, there is provided an apparatus for assigning an IP using agents in a zero configuration network, the apparatus involving: (1) a home agent, comprising: (i) a message forming portion for forming a home agent advertisement message containing (a) a home agent IP address, (b) an address answer message for the user computer which contains the hardware address and ID of the user computer and indicates permission for user computer address registration, and (c) an authentication answer message for receiving an authentication request from the foreign agent and performing authentication; (ii) a home agent encoding portion for encoding the messages formed above; and (iii) an IP address registration portion for registering the IP address of the user computer; and (2) a foreign agent, comprising: (i) an authentication request portion for receiving the registration request message of the user computer and generating an authentication request message to be transmitted to the home agent; and (ii) a foreign agent encoding portion for encoding the user computer address answer message; wherein the zero configuration network provided with the home agent administrating a user computer registered to the network and the foreign agent administrating a user computer not registered to the network.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The present invention now will be described more fully with reference to the accompanying drawings, in which preferred embodiment of the invention is shown. This invention may, however, be embodied in many different forms and should not be construed as being limited to the embodiment set forth herein; rather, the embodiment is provided so that this disclosure will be thorough and complete, and will fully convey the concept of the invention to those skilled in the art. The same reference numerals in different drawings represent the same elements, and thus their description will be omitted.

Figure 1:
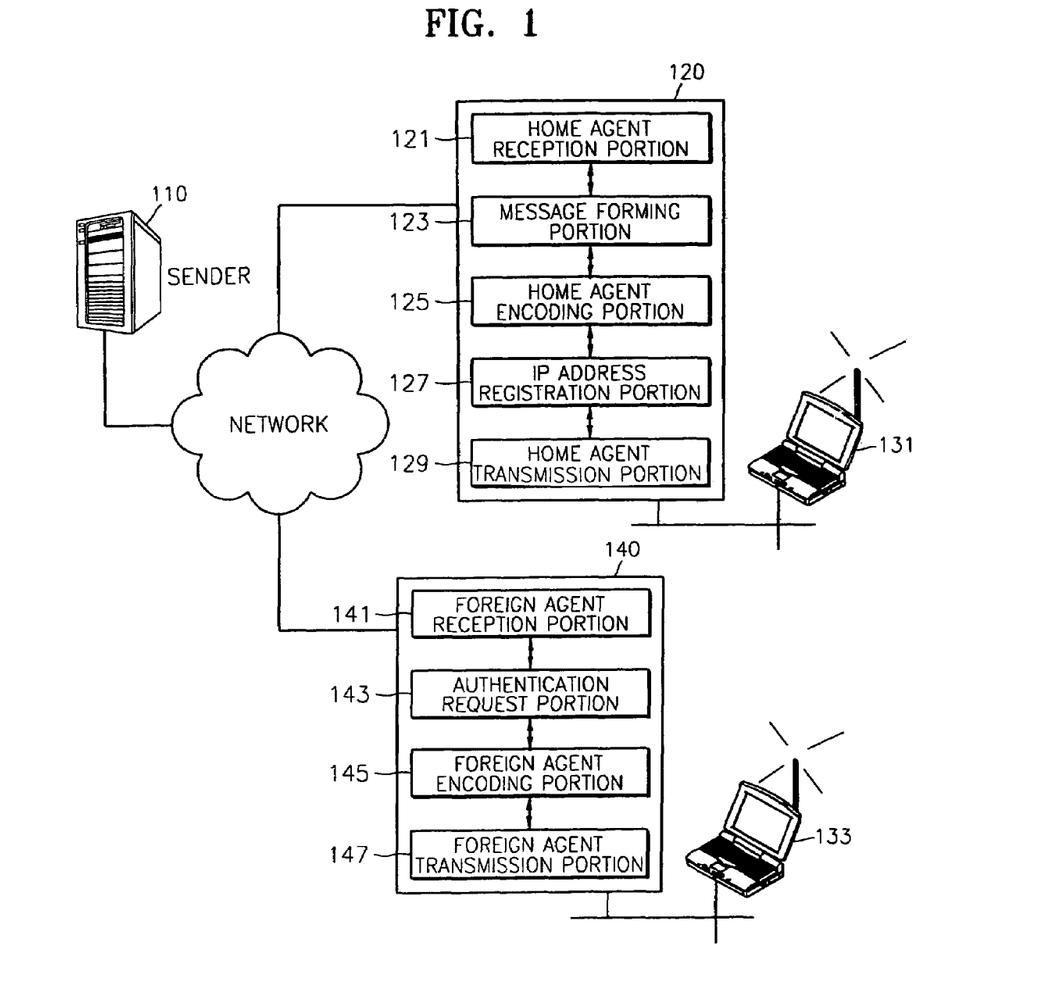
FIG. 1 is a block diagram describing the configuration of a network using a zero configuration in accordance with the present invention.

Referring to FIG. 1, which is a block diagram describing the configuration of a network using a zero configuration in accordance with the present invention, a zero configuration (to be referred to as zeroconf hereafter) network includes a sender 110, a zeroconf home agent (to be referred to as a home agent hereafter) 120, a zeroconf foreign agent (to be referred to as a foreign agent hereafter) 140, and zeroconf nodes (to be referred to as user computers hereafter) 131 and 133. The sender 110 is a computer that provides and transmits data. It is the same as a sender of a common network.

The home agent 120 comprises a home agent reception portion 121 for receiving a user computer address registration request message that contains the address of the home agent 120 and the ID and password of the user computer 131; a message forming portion 123 for forming an authentication answer message, after receiving an advertisement message of the home agent 120 which contains the home agent IP address, an address answer message for the user computer 131 that contains the hardware address and ID of the user computer 131 and indicates permission for user computer address registration, and an authentication request from the foreign agent 140; a home agent encoding portion 125 for encoding the formed messages; an IP address registration portion 127 for registering the user computer IP address; and a home agent transmission portion 129 for transmitting data to the user computer 131.

The home agent 120 is a basic, functional constituent of a network the mobile user computer has belonged to originally. It performs the functions of assigning, authenticating and encoding IP addresses, and transmitting them. The home agent 120 publicises itself by using a router advertisement message of an Internet Control Message Protocol (ICMP) and provides network service to a user computer that enters the network the home agent 120 administrates. The router advertisement message is a message that informs the existence, or non-existence, of a router and the router address. The home agent 120 performs such additional functions as registration/deletion of a Virtual Local Area Network (VLAN), supporting the router advertisement message of the ICMP, authentication using a public key, and transmission of a Domain Name System (DNS) registration/deletion request message.

A foreign agent 140 comprises a foreign agent reception portion 141 for receiving information from a user computer 133; an authentication request portion 143 for generating an authentication request message to be transmitted to the home agent 120 after receiving information from the user computer 133; a foreign agent encoding portion 145 for encoding a user computer address answer message; and a foreign agent transmission portion 147 for transmitting information to the user computer 133.

The basic functions of the foreign agent 140 includes the assignment, authentication and encoding of IP addresses, and transmission of them. The foreign agent 140 publicizes itself by using a Router Discovery Protocol, and provides network service to the user computers 131 and 133 which enter the network the foreign agent 140 administrates. Here, the user computer 133 is a user computer that has moved.

The foreign agent 140 can provide network service to the user computer 131 that is not under its administration, if it requests IP address authentication to the home agent 120 and receives authentication therefor. The user computers 131 and 133 are computers with static mobility and the objects that receive the service from the home agent 120 or the foreign agent 140.

Figure 2A:
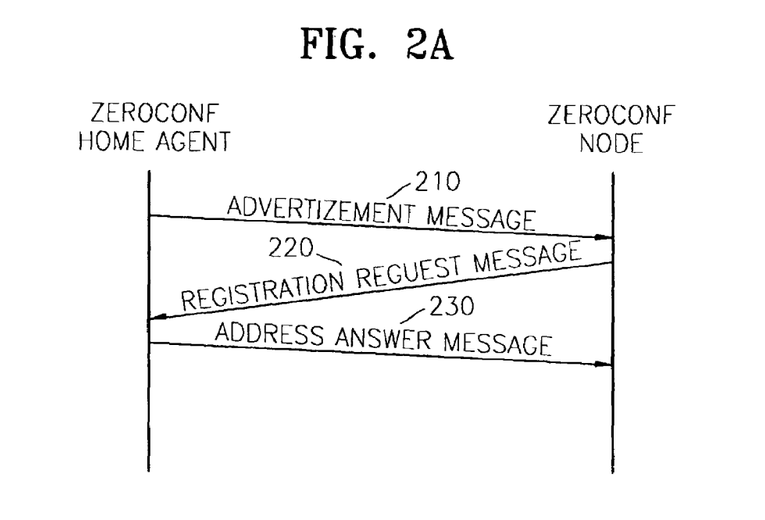
FIG. 2A is a diagram illustrating a flow of a zeroconf node being registered in a zeroconf home agent in accordance with an embodiment of the present invention.

Referring to FIG. 2A, which illustrates the user computer being registered to the home agent 120 in accordance with a preferred embodiment of the present invention, the user computer 131 registers its ID and password to the home agent 120. In step 210, the home agent 120 transmits a zeroconf agent advertisement message, which will be described in detail in FIG. 5A, and publicises the existence of the home agent 120. In step 220, the user computer 131 transmits a registration request message which will be described in detail in FIG. 5B of the user computer 131 that contains the value of the home agent address obtained from the advertisement message, to the home agent 120.

In step 230, the home agent 120 compares the ID and password of the user computer 131, which is contained in the registration request message received from the user computer 131, with the ID and password registered at step 220, and sends out a user computer address answer message, which will be described in detail in FIG. 5C, to the user computer 131.

If the registration request is permitted by the home agent 120, the user computer 131 registers the home agent IP address contained in the user computer address answer message as the IP address of a home agent administrating the user computer 131.

Figure 2B:
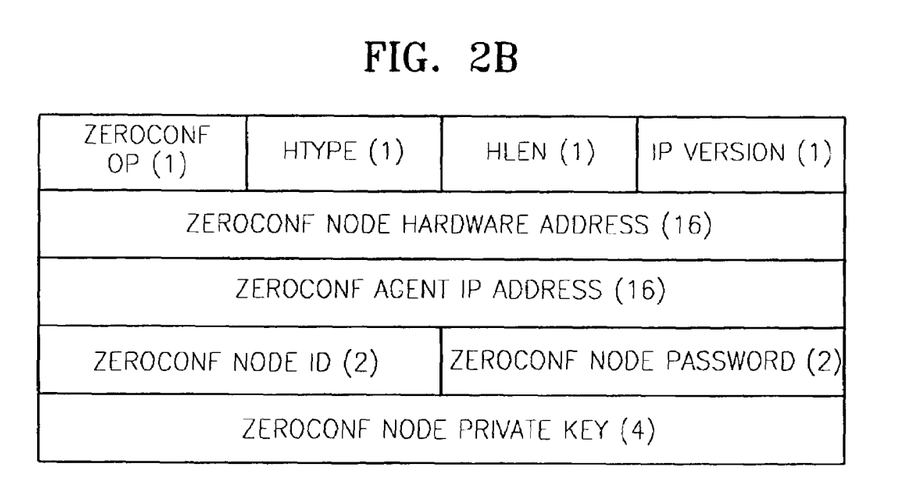
FIG. 2B is a diagram showing a field for a zeroconf node address answer message which is transmitted to the zeroconf node, when the registration is permitted by the zeroconf home agent in accordance with an embodiment of the present invention.

In FIG. 2B, which describes a field for a user computer address answer message that is transmitted to the user computer 131, when the registration of the user computer is permitted by the home agent 120 in accordance with an embodiment of the present invention, the numbers in the parentheses denote the octet a field occupies. A Zeroconf Op (zeroconf operation) defines a zeroconf version (4 bits) and a zeroconf Op message. Content information of a zeroconf Op message is defined as shown in the Table 1.

TABLE 1

| Zeroconf Op Message | Definition of a Zeroconf Op Message |
| --- | --- |
| 0001 | A network setup request message from a user computer to a zeroconf agent |
| 0010 | A network setup permission answer message from a zeroconf agent to a user computer |
| 0011 | A network setup rejection answer message from a zeroconf agent to a user computer |
| 0100 | An authentication request message from a foreign agent to a home agent |

TABLE 1-continued

| Zeroconf Op Message | Definition of a Zeroconf Op Message |
|---|---|
| 0101 | An authentication permission message from a home agent to a foreign agent |
| 0110 | An authentication rejection message from a home agent to a foreign agent |
| 0111 | An advertisement message from a zeroconf agent to a user computer |
| 1000 | A registration request message from a user computer to a home agent |
| 1001 | A registration request permission message from a home agent to a user computer |
| 1010 | A registration request rejection message from a home agent to a user computer |

For example, when the zeroconf version is 1, the value of the Zeroconf Op that the user computers 131 and 133 send out to a zeroconf agent is 00010001. Here, the zeroconf agent represents the home agent 120 or the foreign agent 140.

An Htype stands for a hardware type of a user computer's network device. It follows the definition on a hardware type of a Dynamic Host Configuration Protocol (DHCP). For example, in case of an Ethernet, the Htype is 0110. An Hlen signifies the octet of the hardware addresses of the user computers 131 and 133, and an Internet Protocol (IP) version stands for the version of an IP used in the network. For example, in case of the Ethernet, the hardware address of the user computers 131 and 133 is the address of the Ethernet.

A zeroconf agent IP address denotes the IP address of the zeroconf agent; a user computer ID, the identification mutually registered between the user computer and the home agent; a user computer password, the password of the user computer; a user computer private key, the private key of the user computer which is possessed only by the home agent and the user computer.

Figure 3:
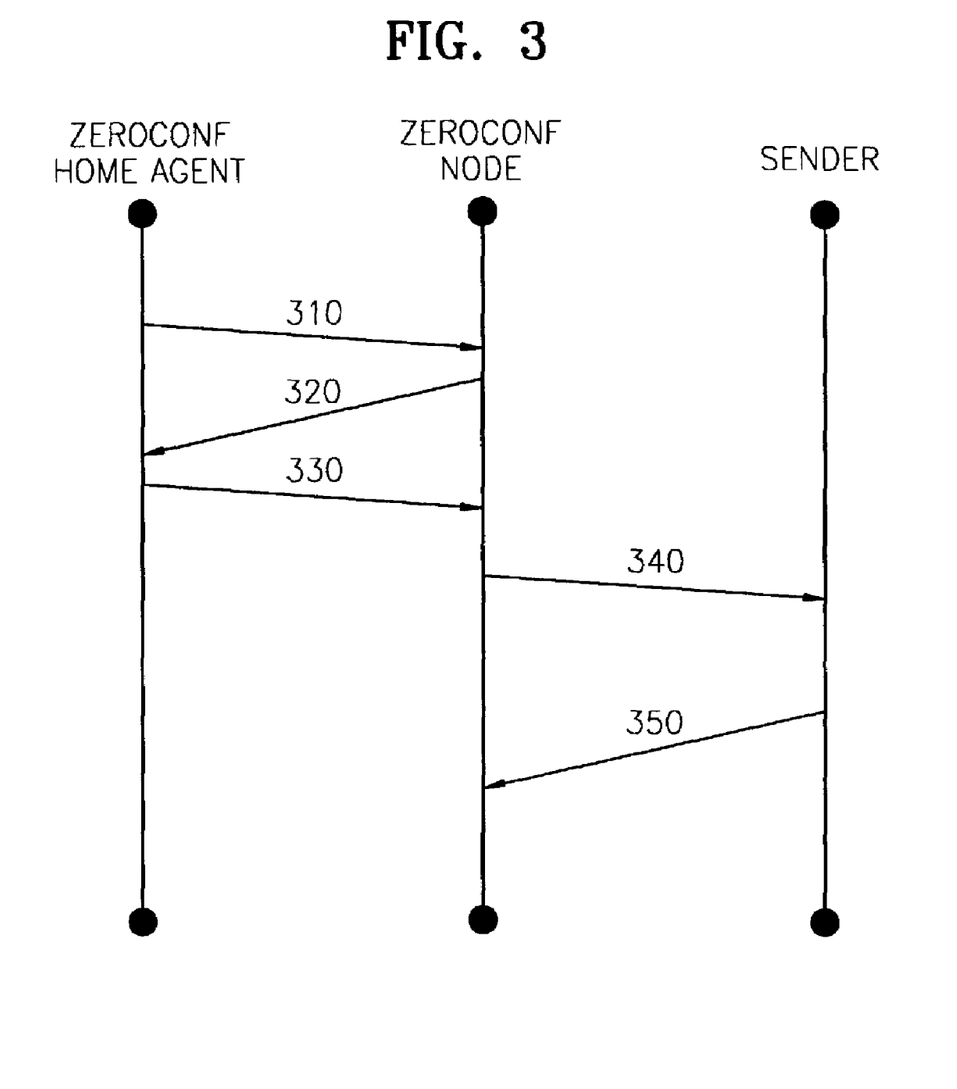
FIG. 3 is a diagram describing an Internet protocol (IP) address assignment method for a case where the zeroconf node is within the coverage of a network administrated by the registered zeroconf home agent in accordance with an embodiment of the present invention.

Referring to FIG. 3, which describes an IP address assignment method when the user computer is within the coverage of a network administrated by the home agent in accordance with an embodiment of the present invention, first, the user computer 131 is booted in the coverage of the home agent 120. Here, in step 310, the home agent 120 continues to publicize itself by using a router advertisement message of the ICMP and transmitting an advertisement message. Then, in step 320, the user computer 131 sends out a user computer registration request message containing the IP address of the home agent, the ID and password of itself to the home agent 120.

The home agent 120 receives the user computer registration request message, and if the user computer is under its administration, it encodes and transmits the IP address to be assigned, the address of a default router (gateway), and the Domain Name System (DNS) address by using an address answer message, which will be described in detail in FIG. 5C. Then, in step 330, it registers the IP address to be assigned to network equipment, or a virtual Local Area Network (VLAN) it possesses, thus making the user computer use the service within its coverage.

In step 340, the user computer 131 sets up a network environment by decoding the encoded information on the assigned IP address, the default router address and the DNS address, which are received from the home agent 120, with a private key the user computer possesses. A private key is possessed only by the home agent 120 and the user computers 131, 133. Then, in step 350, the user computer 131 receives data from the sender 110 and performs network operation. Here, the user computer 131 transmits a message requesting registration/deletion to the DNS by using the cooperative DHCP and DNS.

Figure 4:
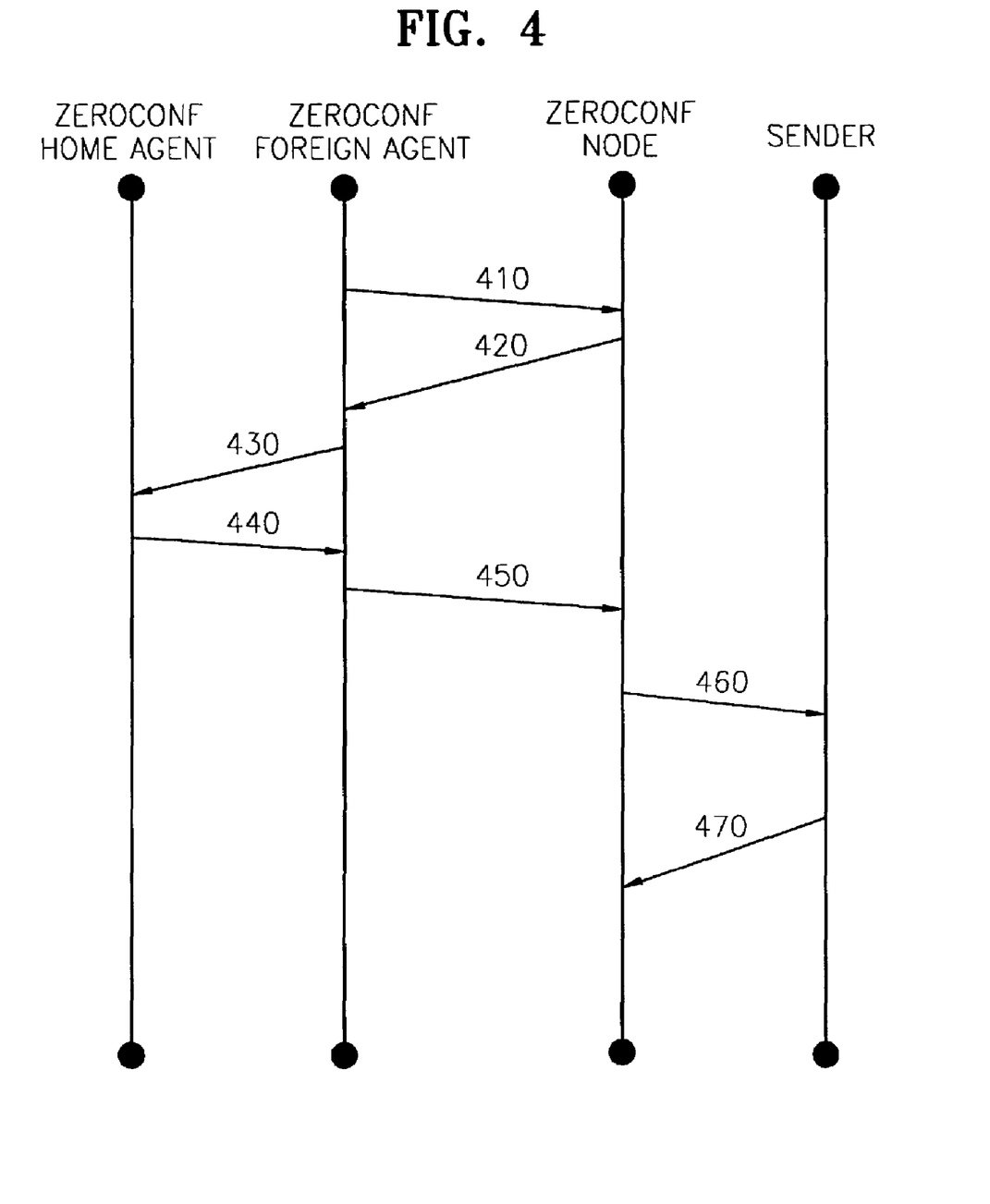
FIG. 4 is a diagram illustrating an IP address assignment method for a case where the zeroconf node is in the coverage of a network administrated by a zeroconf foreign agent in accordance with an embodiment of the present invention.

Referring FIG. 4, which illustrates an IP address assignment method for a case where the user computer is in the coverage of a network administrated by a foreign agent, first, the user computer 133 is booted in the coverage of another network to which it is not registered. Here, in step 410, the foreign agent 140 continues to transmit an advertisement message to the network of the foreign agent 140 by using a router advertisement message of the ICMP.

In step 420, the user computer 133 sends out a registration request message that requests for registration of the user computer address containing information, such as the home agent IP address and the user computer ID, to the foreign agent 140 known from the router advertisement message. Here, the same registration request message is sent out to the home agent 120 and the foreign agent 140 so as to minimize the amount of process to be treated by the user computer.

In step 430, if the foreign agent 140 receives the registration request message, and if it has an available IP address to assign to the user computer 133, it transmits to the home agent 120 an authentication request message carrying the address of the foreign agent, the user computer ID, and the available IP address. The authentication request message will be described in detail in FIG. 6A.

The home agent 120 receives the authentication request message, and if the ID carried in the authentication request message is that of the user computer 131 registered to itself, the home agent 120 transmits an authentication answer message carrying information of whether or not the user computer can be authenticated, and the public key of the corresponding user computer, to the foreign agent 140. The authentication answer message will be described in detail in FIG. 6B. Then, in step 440 the foreign agent 140 registers the available IP address to a switch, a router or the VLAN administrator of the home agent 120, and makes the user computer to be in the coverage of the home agent 120 and use the service.

In step 450, after receiving the authentication answer message from the home agent 120 and confirming authentication, the foreign agent 140 encodes the user computer address setup answer message, that contains information such as the reserved IP address, the address of the default router and the DNS address, with the public key received from the home agent 120, and transmits it to the user computer 133.

In step 460, the user computer 133 decodes the encoded user computer address setup answer message which is from the foreign agent 140 and carrying information on the IP address that is reserved to be provided, the address of the default router and the DNS address, with its own private key, and sets up a network environment. Then, in step 470, the user computer 133 can use the network and receive data from the sender 110.

Figure 5A:
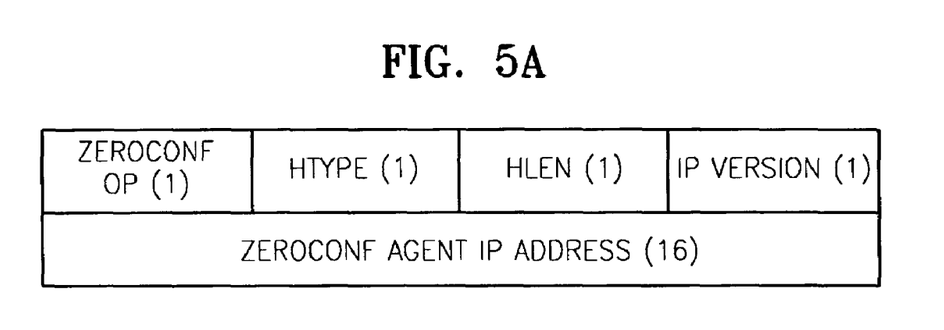
FIGS. 5A through 5C are diagrams showing messages transmitted between the zeroconf node and agents, FIGS. 5A, 5B and 5C denoting a zeroconf agent advertisement message, a zeroconf node address request message and a zeroconf node address answer message, respectively.
Figure 5B:
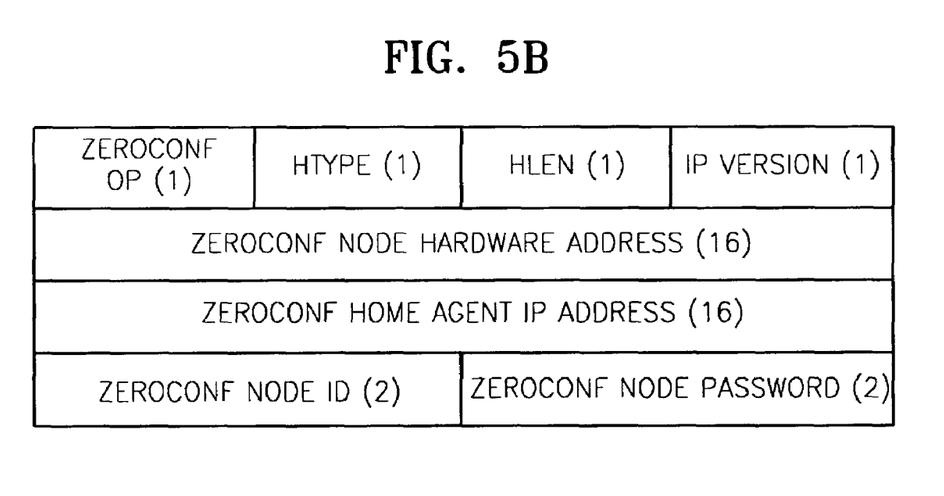
Figure 5C:
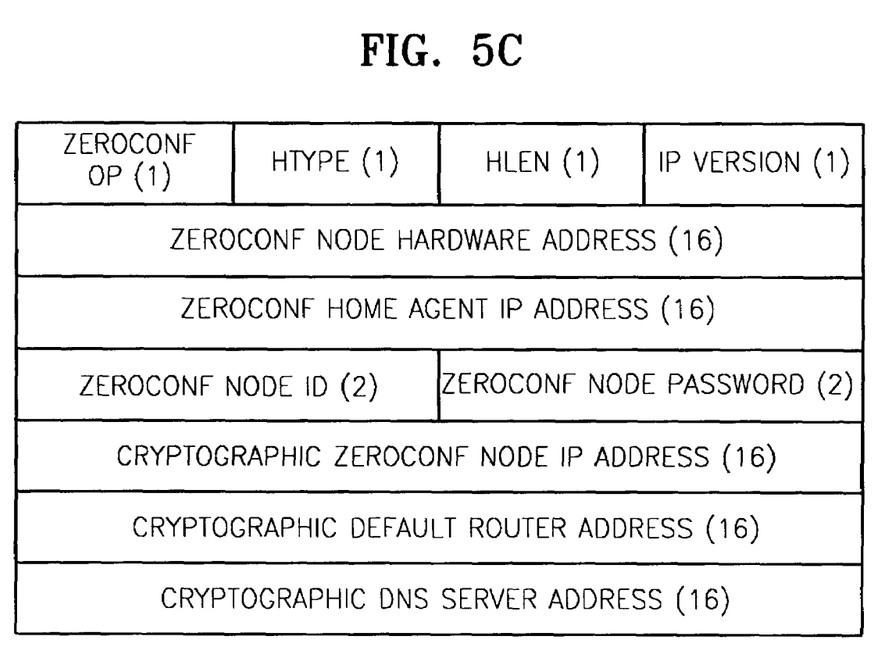

FIGS. 5A through 5C describe messages transmitted between the user computer and the agents. Here, FIG. 5A shows an advertisement message and is positioned in the advertisement region of the ICMP, and FIG. 5B illustrates a registration request message, in which the user computers 131 and 133 request for an IP address to the zeroconf agents 120 and 140. FIG. 5C depicts a user computer address answer message, which is an answer message that the zeroconf agents 120 and 140 transmit to the user computers 131 and 133.

Messages of FIGS. 5A through 5C are based on a 32-bit basic frame, and the message fields are described in detail below. The numbers in the parentheses denote the octet the field occupies.

A Zeroconf Op represents the characteristics of a zeroconf version (4 bits) and a zeroconf message. The characteristic of a message is as defined in FIG. 2B, and an Htype denotes a hardware type of a user computer, while an Hlen stands for the octet of a user computer hardware address. An IP version signifies the version of the IP used in a network. The user computer hardware address denotes the hardware address of the user computer. For example, in case of the Ethernet, the user computer hardware address is the address of the Ethernet.

A home agent IP address is the IP address of a home agent, and a user computer ID is an ID mutually registered to a user computer and a home agent. A user computer password stands for the password of a user computer.

A cryptographic zeroconf node IP address is an IP address assigned to a user computer that is encoded by a public key. A cryptographic default router address is an IP address of a default router to be used by a user computer that is encoded by the public key. A cryptographic DNS address is an IP address of a DNS to be used by a user computer that is encoded by the public key.

The present invention designs the length of all IP addresses to be 128 bits so as to be compatible with the Internet Protocol version 4 (IPv4) as well as the Internet Protocol version 6 (IPv6).

The advertisement message, which is a message the zeroconf agents 120 and 140 inform a user computer of itself, includes a Zeroconf Op, Htype, Hlen, IP version and zeroconf agent address. It relies on the advertisement part of the router advertisement message of the ICMP.

However, considering a transmission range of a message, the TTL of the IP should be set up to be 1, and a link layer destination address should be the same as the link layer address of an ICMP agent solicitation packet.

A registration request message that the user computers 131 and 133 request an IP to the zeroconf agents 120 and 140 enters a value to the Zeroconf Op, Htype, Hlen, IP version, user computer hardware address, home agent IP address, user computer ID and user computer password. The address answer message transmitted from the zeroconf agents 120 and 140 in response to the registration request message includes a cryptographic zeroconf node IP address, cryptographic default router address, and cryptographic DNS address, as well as a registration request message. The repeating field of an address answer message is used for the purpose of confirmation.

Figure 6A:
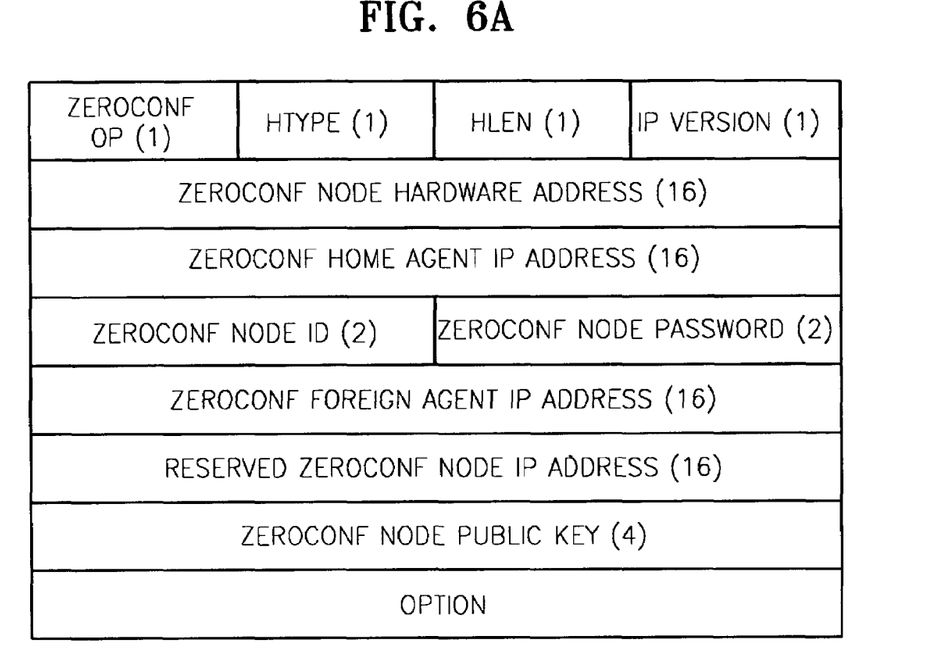
FIGS. 6A and 6B are diagrams showing messages between the zeroconf agents, each diagram denoting an authentication request message of the zeroconf foreign agent and an authentication answer message of the zeroconf home agent.
Figure 6B:
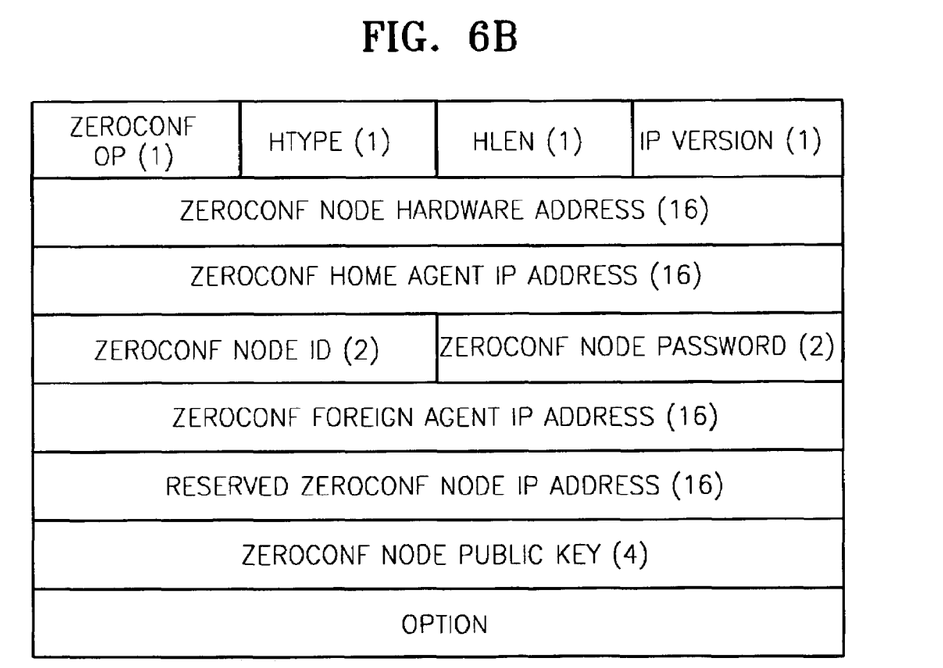

FIGS. 6A and 6B show messages between zeroconf agents, FIG. 6A denoting an authentication request message for the foreign agent and FIG. 6B, an authentication answer message of the home agent. The numbers in the parentheses denote the octet the field occupies. The present invention designs the length of all IP addresses to be 128 bits so as to be compatible with an IPv4 as well as an IPv6.

A Zeroconf Op (operation), Htype, Hlen and IP version are as described in FIG. 2B. The user computer hardware address stands for the hardware address of a user computer. For example, in case of an Ethernet, the user computer hardware address is the address of the Ethernet. A home agent IP address denotes the IP address of a home agent, and a user computer ID represents an ID mutually registered to a user computer and a home agent. A user computer password stands for the password of a user computer. A foreign agent IP address represents the IP address of a foreign agent in the region into which the user computer is moved. A reserved user computer IP address is an IP address that a foreign agent would assign to a zeroconf node. A user computer public key means a public key of a user computer paired with private key of user computer and the public key is transmitted from a home agent to a foreign agent. An option is a field for a VLAN or other additional functions.

The foreign agent authentication request message is a message the foreign agent transmits to the home agent. The foreign agent authentication request message includes a Zeroconf Op, Htype, Hlen, IP version, user computer hardware address, home agent IP address, user computer ID, user computer password, foreign agent IP address, and reserved user computer IP address.

The home agent authentication answer message uses the foreign agent authentication request message and fills up the Zeroconf Op field and the public key field. In case of using a VLAN, the option field is used.

The present invention can be embodied in a computer-readable code in a computer-readable recording medium. The computer-readable recording medium includes all kinds of recording apparatuses in which data that can be read by a computer system are stored, such as ROMs, RAMs, CD-ROMs, magnetic tape, hard disks, floppy disks, flash memory, optical data storage apparatuses. Also included is what is embodied in the form of career waves, such as transmission through the Internet. The computer-readable recording medium may be dispersed in a network-connected computer system, and the present invention can be stored in a code that a computer can read from the dispersed recording media, and performed.

As described above, the method of the present invention does not overload a network because this method does not perform triangle routing like a mobile IP, which means that data does not go to a mobile node directly but passes through agents. What a zeroconf agent does is to provide encoded IP information to a user computer and modify data registered in a VLAN. Therefore, the present invention, which does not overload agents, can be used widely.

By adopting an authentication method using public and private keys, the present invention solves the problem of security, which has been the biggest problem of the DHCP. As security is ensured, it can be applied to electric commercial transactions. In addition, since a VLAN can be used as an additional function, it is possible to use another network just as the network the user computer belongs to.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for assigning an Internet Protocol (IP) address in a zero configuration network, comprising:
   (a) receiving a registration request message of a user computer which contains a home agent IP address, and the ID and password of the user computer;
   (b) transmitting to the user computer an encoded address answer message which indicates permission of the address registration, the encoded address answer message includes the home agent IP address, a default router address, and a Domain Name Server address; and
   (c) setting up a network environment in the user computer by decoding the encoded address answer message with a private key and registering the home agent IP address, default router address, and Domain Name Server address.

2. The method of claim 1, further comprising a step of registering the ID and password of the user computer to the home agent prior to step (a).

3. The method of claim 1, wherein step (a) further comprises a step of transmitting an agent advertisement message from the home agent to the user computer.

4. The method of claim 3, wherein the agent advertisement message includes the version of the zero configuration network, message content information, hardware type of the user computer, hardware address of the user computer, and IP address of the home agent.

5. The method of claim 1, wherein in step (a), the user computer registration request message comprises the user computer's hardware address, home agent IP address, and ID and password of the user computer.

6. The method of claim 1, wherein in step (b), a message containing the encoded home agent IP address, the default router address and the Domain Name Server address is received.

7. The method of claim 1, wherein step (b) further comprises step of registering the home agent IP address to a database of a virtual Local Area Network.

8. A method for assigning an Internet Protocol (IP) using agents in a zero configuration network provided with a home agent administrating a user computer registered to the network and a foreign agent administrating a user computer not registered to the network, the method comprising:
(a) transmitting to the foreign agent IP address a user computer registration request message out of an advertisement message received from the foreign agent;
(b) the foreign agent receiving the user computer registration request message and then transmitting an agent authentication request message to the home agent;
(c) the home agent confirming the user computer ID and transmitting an agent authentication answer message to the foreign agent;
(d) the foreign agent encoding an address answer message for the user computer and transmitting the address answer message to the user computer, the address answer message includes a home agent IP address, a default router address, and a Domain Name Server address; and
(e) the user computer decoding the user computer address answer message and setting up a network environment.

9. The method of claim 8, wherein in step (a), the agent advertisement message contains the version of the zero configuration network, message content information, hardware type of the user computer, user computer hardware address and home agent IP address, while the user computer registration request message contains the user computer hardware address, home agent IP address, and ID and password of the user computer.

10. The method of claim 8, wherein in step (b), the agent authentication request message contains the user computer ID, the home agent IP address, and an IP address available to be provided.

11. The method of claim 8, wherein in step (c), the agent authentication answer message that contains information on whether the user computer can be authenticated by checking whether or not the user computer ID is registered from the agent authentication answer message and on a public key of a registered user computer is transmitted to the foreign agent.

12. The method of claim 10, wherein step (c) further includes a step of registering the available IP address to the home agent.

13. An apparatus for assigning an Internet Protocol (IP) using agents in a zero configuration network, the apparatus comprising:
a home agent, which includes:
a message forming portion for forming a home agent advertisement message containing a home agent IP address, an address answer message for a user computer which contains a hardware address and ID of the user computer and indicates permission for user computer address registration, and an authentication answer message for receiving an authentication request from a foreign agent and performing authentication;
a home agent encoding portion for encoding the messages formed above; and
an IP address registration portion for registering the IP address of the user computer; and
a foreign agent, which includes:
an authentication request portion for receiving a registration request message of the user computer and generating an authentication request message to be transmitted to the home agent; and
a foreign agent encoding portion for encoding the user computer address answer message;
wherein the zero configuration network provided with the home agent administrating a user computer registered to the network and the foreign agent administrating a user computer not registered to the network, and the address answer message includes the home agent IP address, a default router address, and a Domain Name Server address.

14. The method of claim 1, wherein the home agent further comprises a reception portion for receiving an address registration request message of the user computer containing the home agent IP address, and the ID and password of the user computer.

15. A computer-readable medium containing instructions that, when executed, cause a computer to:
receive a registration request message of a user computer which contains a home agent IP address, and an ID and password of a user computer;
transmit to the user computer an encoded address answer message which indicates permission of an address registration, the encoded address answer message includes the home agent IP address, a default router address, and a Domain Name Server address; and
set up a network environment in the user computer by decoding an encoded address answer message with a private key and registering the home agent IP address, default router address, and Domain Name Server address.

16. A computer-readable medium containing instructions that, when executed, cause a machine to:
assign an Internet Protocol (IP) using agents in a zero configuration network provided with a home agent administrating a user computer registered to the network and a foreign agent administrating a user computer not registered to the network, the assign the IP further comprising instructions that, when executed, cause the machine to:
transmit to the foreign agent IP address a user computer registration request message out of an advertisement message received from the foreign agent;

the foreign agent to receive the user computer registration request message and then transmit an agent authentication request message to the home agent;

the home agent to confirm the user computer ID and transmit an agent authentication answer message to the foreign agent;

the foreign agent to encode an address answer message for the user computer and transmit the address answer message to the user computer, the address answer message includes a home agent IP address, a default router address, and a Domain Name Server address; and the user computer to decode the user computer address answer message and set up a network environment.

* * * * *